B. W. BEAN.
CLUTCH FOR TRANSMISSION PULLEYS.
APPLICATION FILED JAN. 28, 1910.
999,948.
Patented Aug. 8, 1911.
3 SHEETS—SHEET 1.
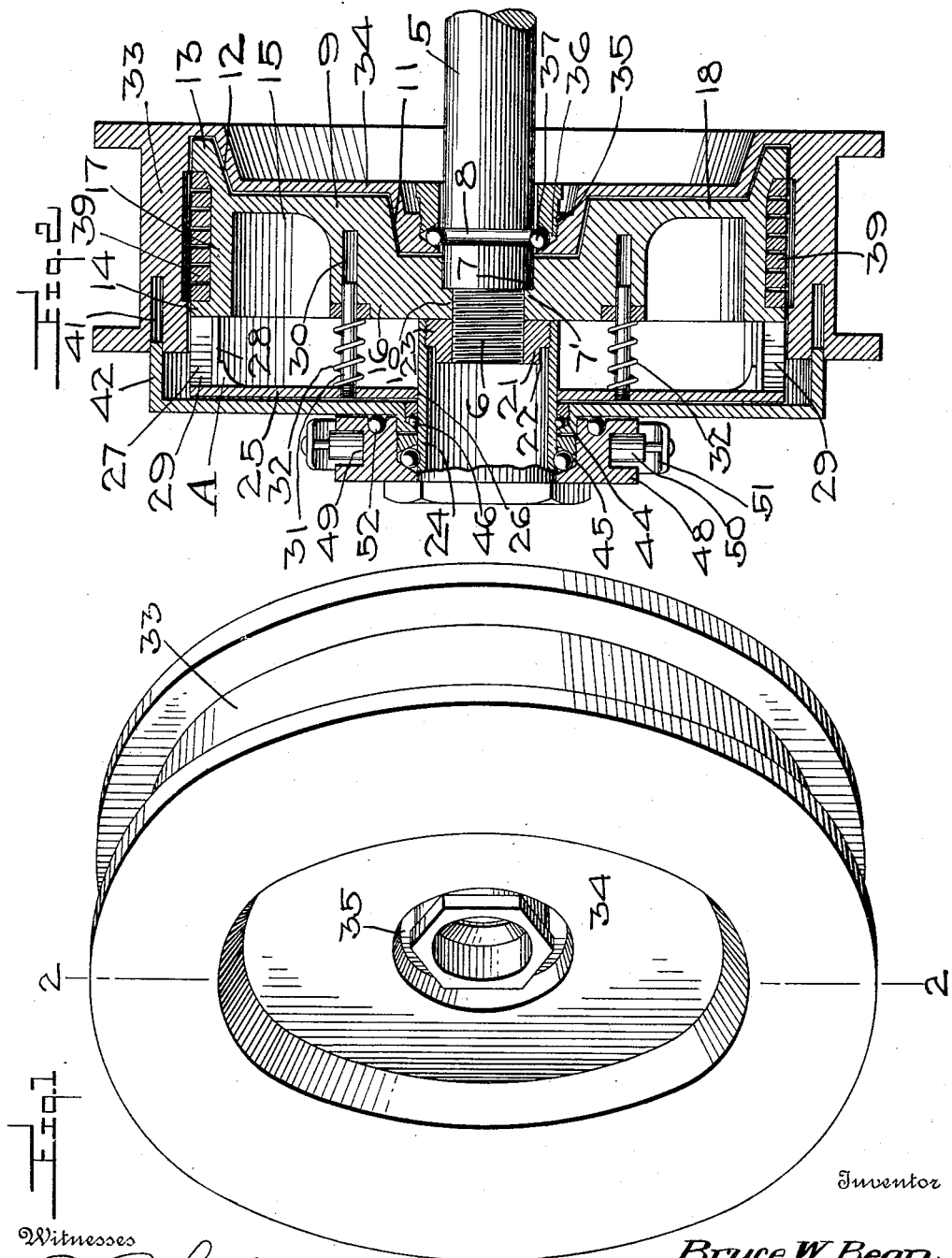
Witnesses
Ed. R. Lusby
M. L. Lowry
Inventor
Bruce W. Bean
By Woodward & Chandler
Attorneys

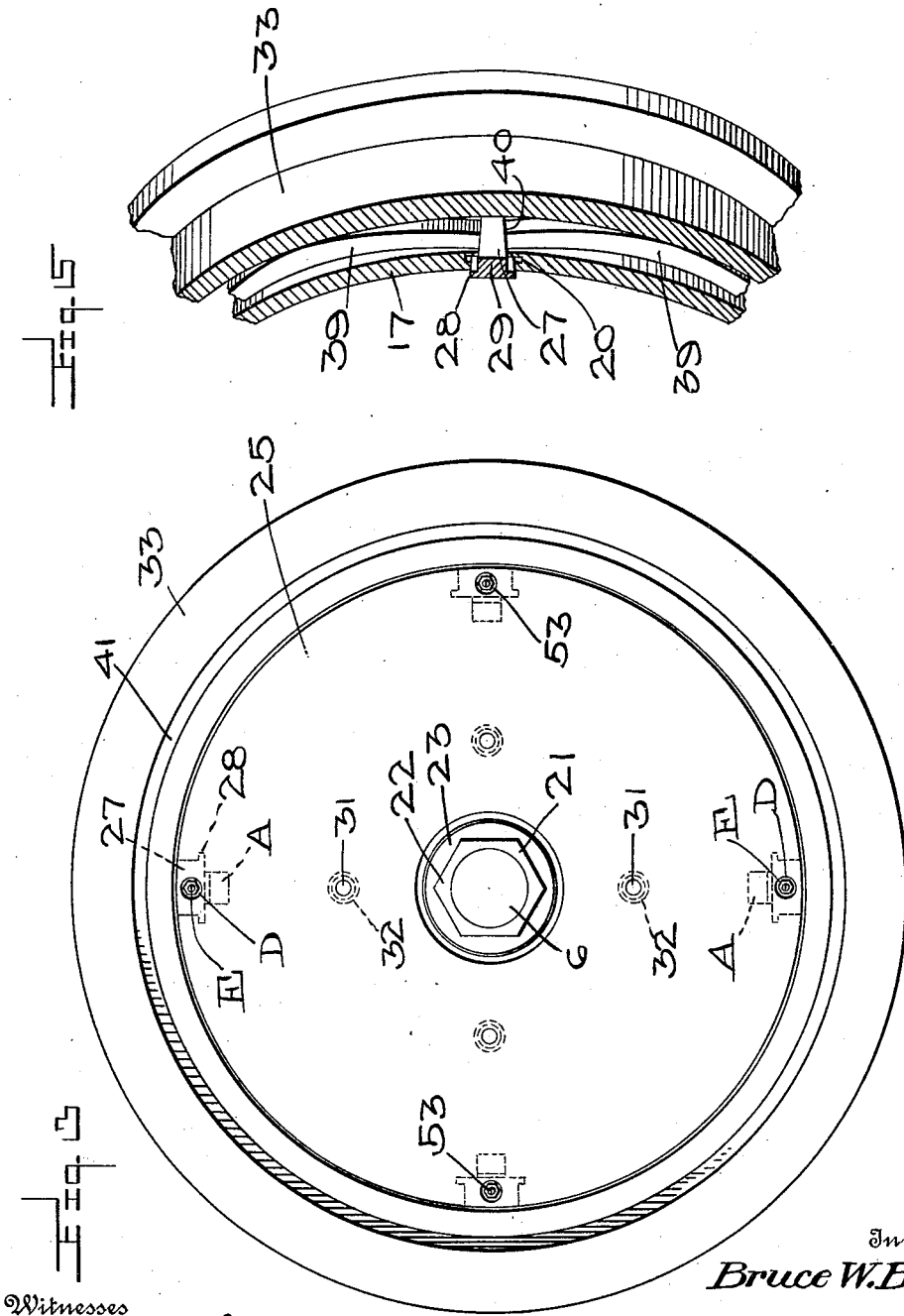

B. W. BEAN.
CLUTCH FOR TRANSMISSION PULLEYS.
APPLICATION FILED JAN. 28, 1910.
999,948.
Patented Aug. 8, 1911.
3 SHEETS—SHEET 3.
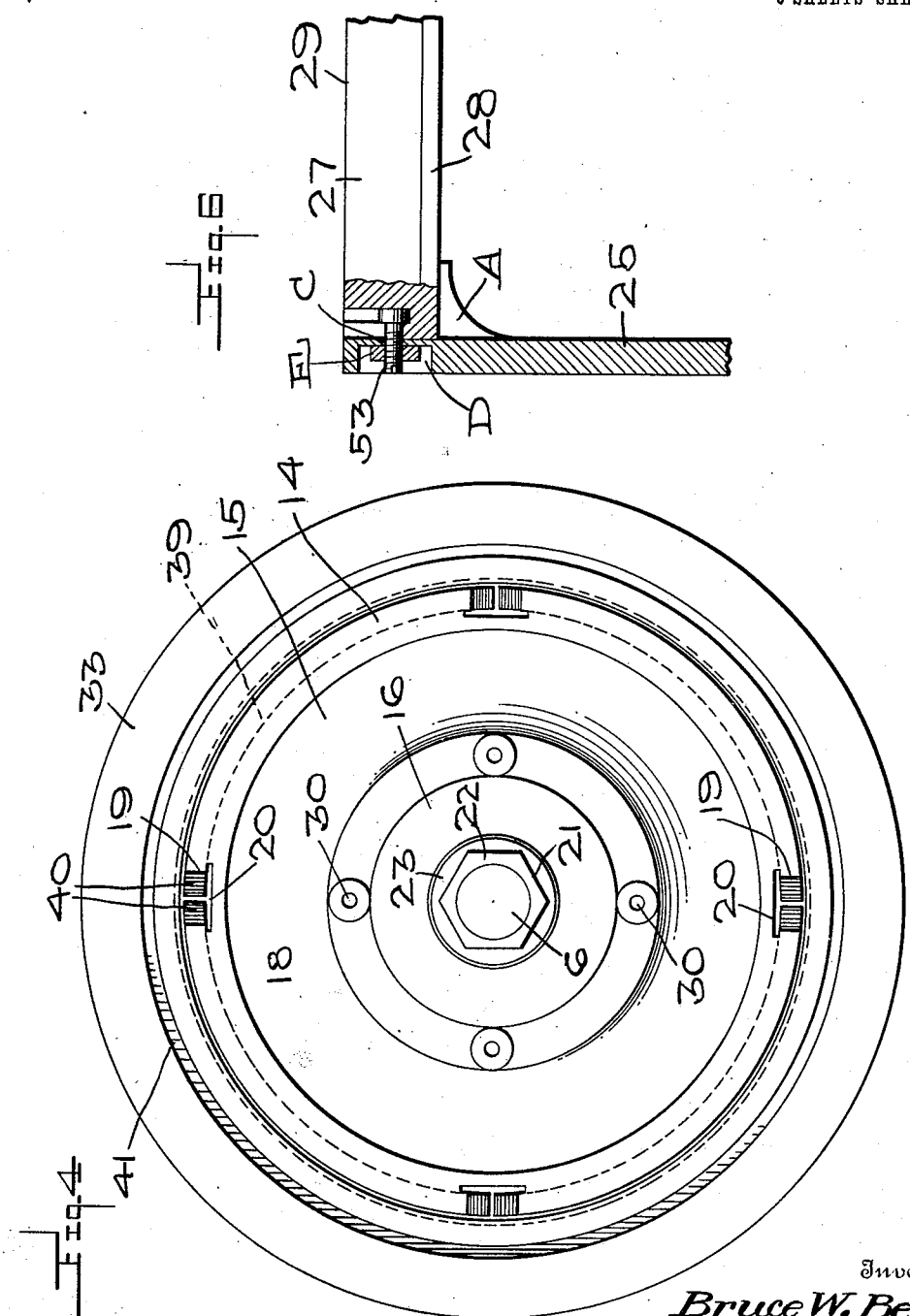
Witnesses
Ed. R. Lusly
M. L. Lowe
Inventor
Bruce W. Bean
By Woodward & Chandler
Attorneys

UNITED STATES PATENT OFFICE.

BRUCE W. BEAN, OF LANSDALE, PENNSYLVANIA.

CLUTCH FOR TRANSMISSION-PULLEYS.

999,948.  Specification of Letters Patent.  Patented Aug. 8, 1911.

Application filed January 28, 1910. Serial No. 540,510.

*To all whom it may concern:*

Be it known that I, BRUCE W. BEAN, a citizen of the United States, residing at Lansdale, in the county of Montgomery and State of Pennsylvania, have invented certain new and useful Improvements in Clutches for Transmission-Pulleys, of which the following is a specification.

This invention relates to transmission devices, and more particularly to clutches for pulleys, and has for its object to provide a pulley including a shaft carried member and a revoluble member, and means for locking the shaft carried member and the revoluble members together for rotation with the shaft.

Another object is to provide a structure which will be simple in arrangement and construction, and in which the parts will be so disposed that they may be adjusted to compensate for wear.

Other objects and advantages will be apparent from the following description, and it will be understood that changes in the specific structure shown and described may be made within the scope of the claim without departing from the spirit of the invention.

In the drawings forming a part of this specification, and in which like numerals of reference indicate similar parts in the several views, Figure 1 is a perspective view of the inner side of the pulley, Fig. 2 is a longitudinal section on the line 2—2 of Fig. 1, taken in the plane of the shaft, Fig. 3 is an elevation of the outer side of the pulley with the protecting plate removed to illustrate the arrangement of parts, Fig. 4 is a view similar to Fig. 3 with the expander disk removed and showing the forward face of the fixed member, Fig. 5 is a detail perspective view showing the action of the expanding fingers, Fig. 6 is a detail perspective view upon the insertion of the finger carrying disk showing the adjustable arrangement of the fingers.

Referring to the drawings, there is shown a power shaft 5, having a threaded outer or forward end 6, the threaded portion terminating at its inner end at a shoulder 7, as shown. Inwardly of the threaded portion, and at a point spaced therefrom, there is a ball race 8, for a purpose to be presently described. A fixed member 9 is provided with a central opening 10 which is engaged upon the reduced threaded portion 6 of the shaft, and is provided with a shoulder 7' abutting against the shoulder 7. The inner or rearward face of the fixed member is provided with a circular recess 11 surrounding and concentric with the opening 10 and the ball race 8 lies within this recess as shown. The fixed member is circular, as illustrated, and at its rearward or inner side has at its periphery a rearwardly directed annular leaf 12 provided at its edge with an outwardly directed flange 13, coöperating with a flange 14 at the forward edge of the periphery of the fixed member. An annular recess is formed in the outer or forward face of the fixed member, and is indicated at 15. The formation of this recess 15 results in what is in effect an inner boss 16 and an outer circular band 17 connected by a rearward web 18.

At points approximately ninety degrees from each other, the fixed member is provided in its peripheral band portion 17 with transverse slots 19 which open through the forward flange 14 as illustrated. The lower portions of these slots are laterally broadened, as shown at 20, to give the slots an inverted T form.

A nut 21 is engaged with the forward end of the shaft 5 and holds the fixed member 9 thereupon. This nut has a reduced angular portion 22, and an inner enlarged exteriorly threaded portion 23 and engaged at its inner end upon these threads there is a sleeve 24 which extends forwardly as shown.

A disk 25 is provided and has a central opening 26 which is engaged upon the sleeve 24, and at its periphery, this disk is provided with a plurality of rearwardly extending fingers 27. Each of these fingers includes a rectangular base portion 28 arranged for engagement in the inner broadened portion 20 of one of the slots 19, and a superimposed wedge-shaped portion 29 which is arranged for movement transversely through the slots when the disk is slid toward and away from the member 9, which sliding movement is permitted by the arrangement of parts as shown in the drawings.

A plurality of circular recesses 30 are formed in the central boss portion 16 of the fixed member and the disk 25 carries a plurality of inwardly extending fingers 31 which are slidably engaged in these recesses. Helical springs 32 are engaged with the fingers between the disk and the forward face of the boss, and operate to hold the disk yieldably against movement toward the fixed member.

An outer revoluble member 33 is provided for the pulley, and is engaged upon the outer peripheral portion of the fixed member, being arranged for free rotation therearound, and having at its inner side an inwardly extending web which is shaped to conform to the configuration of the inner face of the fixed member 9. This web 34 has a central opening 35 surrounding the shaft 5, and provided with a ball race 36, cooperating with the race 8 to receive balls 37. The revoluble member may be made as a drop forging, and thus given sufficient strength for the purpose to which it is put. The ball race portion, as shown is offset inwardly and occupies a plane approximately in the center of the revoluble member.

Disposed between the inner fixed member 9 and the revoluble member 33, and resting between the flanges 13 and 14 of the inner member, there are a plurality of arcuate gripping members 39 which have their mutually adjacent ends disposed at the slots 19. These mutually adjacent ends are beveled so that they converge inwardly and rearwardly as indicated at 40, and they are thus arranged to receive the superimposed wedge-shaped portions 29 of the fingers 27 therebetween, when the disk 25 is moved inwardly. This engagement of the fingers 27 with the members 39 causes these members to separate and firmly bind against the inner face of the free member 33, and clamp this member against rotation with respect to the fixed member.

The member 33 has in its forward face a circular concentric groove 41 which receives a rearwardly directed flange 42 carried by the outer periphery of a protecting plate 43, which has a central opening 44 engaged upon the sleeve 24. The plate has a ball race 45 surrounding its opening, and balls 46 are engaged in this race and bear upon the sleeve 24 so that sliding movement of the plate longitudinally of the sleeve is facilitated. This ball bearing also provides for rotation of the plate with the member 33 should there be any clogging of the flange 42 in the groove 41.

A circular member 48 is engaged with the sleeve 24 outwardly of the plate 43, and has a circumscribing peripheral groove 49 receiving rollers 50 which are carried by the ends of a shifting yoke 51. The member 48 has a ball bearing mounting upon the shaft 24 as shown, and balls 52 are disposed between the member and the plate 43 for free movement of these members with respect to each other.

From the foregoing it will be seen that under normal conditions the member 33 will be free to rotate about the fixed member 9, the member 33 being the belt receiving element of the pulley as will be understood.

When it is desired to rotate the member 33, the lever 51 is operated to move the member 48 inwardly, which movement is communicated to the disk 25 by the plate 43. The fingers 27 are forced between the converged ends of the members 39, and these members are expanded against the inner face of the member 33, as above described. By reason of the ball bearing mounting of the member 48 and the balls located between this member and the plate 43, together also with the rollers 50, the friction between the various parts is reduced to a minimum and the pressure necessary to hold the members 39 expanded is prevented from exerting an undue retarding effect upon the mechanism. The fingers 27 are arranged for adjustment toward and away from the disk 25 through the medium of stems 53 which are engaged through openings C in the disk. Recesses D surround these openings, and engaged with the stems within the recesses are lock nuts E. The stems are rotatably mounted in the fingers 27, and are threaded into the openings C as illustrated. Inwardly projecting webs A are carried by the disk 25, and receive the fingers 27 thereupon as illustrated.

What is claimed is:

In a pulley structure, the combination with an inner member, of an outer member engaged thereupon and arranged for rotation therearound, said inner member having a plurality of transverse slots opening through its periphery, a plurality of gripping members disposed between the inner and outer members and lying with their ends at the slots, wedge fingers engaged in the slots and arranged for movement between the ends of the gripping members, a disk carried by the wedge fingers, means for holding the disk normally with the fingers at the outward limit of their movement, and means for moving the disk to force the wedge fingers between the ends of the gripping members.

In testimony whereof I affix my signature, in presence of two witnesses.

BRUCE W. BEAN.

Witnesses:
  DONALD A. J. GODSHALL,
  A. D. JOHNSON.

Copies of this patent may be obtained for five cents each, by addressing the "Commissioner of Patents, Washington, D. C."